UNITED STATES PATENT OFFICE

3,280,187
2-METHYLSEMICARBAZIDES AND MEANS OF PRODUCING THE SAME

Robert F. Meyer, Ann Arbor, and Betty L. Cummings, Dearborn, Mich., assignors to Parke, Davis & Company, Detroit, Mich., a corporation of Michigan
No Drawing. Filed Apr. 30, 1964, Ser. No. 364,001
7 Claims. (Cl. 260—554)

This invention relates to novel chemical compounds and to means of producing the same. More particularly, this invention relates to 1-(4-chloro-3-sulfamoylbenzoyl)-2-methylsemicarbazides of formula:

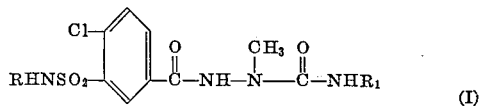

and their corresponding alkali metal salts; where R is hydrogen or a methyl group and $R_1$ is hydrogen, an alkyl group of 1 to 4 carbon atoms or a benzyl or allyl group.

The compounds of the invention possess useful pharmacological properties. In particular, they exhibit significant diuretic activity as demonstrated by standard tests in vivo. The compounds are effective by the oral or parenteral route and, in general, their action is characterized by favorable sodium-to-potassium ion excretion ratios. Hence, the compounds have application in suitable dosage form as diuretic agents, especially in cases where a selective action for the excretion of sodium is desired. Compounds of the invention which are preferred for their diuretic properties are 4-allyl-1-(4-chloro-3-sulfamoylbenzoyl)-2-methylsemicarbazide and 1-[4-chloro-3-(methylsulfamoyl)benzoyl]-2,4-dimethylcarbazide.

In accordance with the invention, the compounds are produced by aminolysis of an oxadiazolinone of formula:

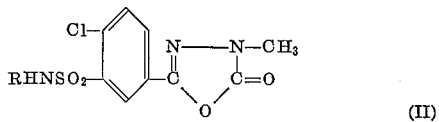

with an amino compound of formula $R_1NH_2$; where R and $R_1$ have the significance specified above. The reaction takes place merely by contacting the reactants for a period of time depending on the temperature employed. For example, the reaction is complete in about 10 minutes at 100° C. or in longer periods up to 24 hours at 30° C. The preferred reaction time is from 30 minutes to 6 hours at inversely corresponding temperatures of 40–95° C. At temperatures higher than 100° C. there is a tendency for loss of yield because of undesirable side reactions whereas at temperatures lower than 30° C. the reaction is unduly slow. At least one molar equivalent, and preferably an excess, of the amino compound is used for the reaction. The reaction is ordinarily carried out in a solvent which is non-reactive and which, for the purposes of the invention may be a substance conventionally regarded as a solvent or it may be an excess of the particular amino reactant being used. Among the many suitable non-reactive solvents may be mentioned water, lower alkanols (methanol, ethanol, isopropanol), ethers (ethyl and isopropyl ethers, tetrahydrofuran, dioxane), hydrocarbons (benzene, toluene, xylene), halogenated hydrocarbons (chloroform, carbon tetrachloride, methylene dichloride, 1,2-dichloroethane), and mixtures of these solvents. Where ammonia is employed as a reactant, the preferred solvent is water, the ammonia being conveniently used as a concentrated aqueous ammonium hydroxide solution.

As indicated, the invention includes products in alkali metal salt form. Such salts, which are preferred for those uses where increased water solubility is desired, are obtained by treatment of compounds of Formula I with a strong alkali metal base such as sodium hydroxide or potassium hydroxide, in accordance with conventional salt-formation procedures.

The invention is illustrated by the following examples.

Example 1

A solution of 20 g. of 2-chloro-5-(4-methyl-5-oxo-$\Delta^2$-1,3,4-oxodiazolin-2-yl)benzenesulfonamide in 100 ml. of concentrated ammonium hydroxide is heated at 40° C. for 5 hours. The solution is evaporated under reduced pressure to remove excess ammonia and is then acidified with dilute acetic acid. The desired product is collected by filtration; M.P. after recrystallization from water, 260° C. (dec.).

The corresponding product, 1-[4-chloro-3-(methylsulfamoyl)benzoyl]-2-methylsemicarbazide, is obtained by using the same procedure but replacing the benzenesulfonamide starting material with the corresponding N-methylbenzenesulfonamide.

The sodium salt of 1-(4-chloro-3-sulfamoylbenzoyl)-2-methylsemicarbazide is obtained by dissolving 3.0 g. of the sulfonamide together with sodium hydroxide (0.44 g.) in 50 ml. of water at room temperature, evaporating the solution to dryness under vacuum at or below room temperature, and isolating and drying the solid salt. The potassium salt is obtained by using potassium hydroxide (0.60 g.) instead of sodium hydroxide. Similarly, such salts with other 2-methylsemicarbazide products of the invention can be obtained by this procedure starting with an equivalent amount of any such 2-methylsemicarbazide.

The benzene sulfonamide starting material can be prepared as follows: A stirred solution of 20 g. of 4-chloro-3-sulfamoyl-$N^2,N^2$-dimethylbenzhydrazide in one liter of dioxane, heated to 70–80° C., is treated with an excess of phosgene vapor, and heating and stirring are continued for one hour more. The resulting solution is evaporated to dryness under reduced pressure, and the solid 2-chloro-5 - (4 - methyl - 5 - oxo - $\Delta^2$ - 1,3,4 - oxadiazolin - 2 - yl)-benzenesulfonamide obtained is crystallized from isopropanol; M.P. 232–233° C.

Example 2

A solution of 20 g. of 2-chloro-5-(4-methyl-5-oxo-$\Delta^2$-1,3,4-oxadiazolin-2-yl)benzenesulfonamide in 50 ml. of butylamine is heated at 75–80° C. for 30 minutes. Excess amine is removed by evaporation under reduced pressure, and the residual gum is triturated with water. The desired product, 4-butyl-1-(4-chloro-3-sulfamoylbenzoyl)-2-methylsemicarbazide, is collected by filtration and purified by recrystallization from acetonitrile; M.P. 218–220° C.

When the butylamine starting material is replaced with an equal amount of allylamine and the reaction is carried out at reflux temperature, this same procedure provides the related product, 4-allyl-1-(4-chloro-3-sulfamoylbenzoyl)-2-methylsemicarbazide; M.P. 226–227° C. (from acetonitrile).

Example 3

A mixture of 5.0 g. of 2-chloro-5-(4-methyl-5-oxo-$\Delta^2$-1,3,4-oxadiazolin-2-yl)-N-methylbenzenesulfonamide and 50 ml. of ethanol saturated with methylamine is heated at reflux for 6 hours. The resulting solution is chilled and the product, 1-[4-chloro-3-(methylsulfamoyl)benzoyl]-2,4-dimethylsemicarbazide, is removed by filtration; M.P. 214–215° C. after recrystallization from acetone.

The N-methylbenzenesulfonamide starting material can be prepared in several steps from known materials, as follows: 4-chlorobenzoyl chloride (158 g.) is added dropwise, with stirring, to a solution of unsymmetrical dimethylhydrazine in 1.5 liters of tetrahydrofuran kept below 40° C. After standing for three hours, the mixture is filtered and the filtrate taken to dryness. The resulting solid, 4-chloro-$N^2,N^2$-dimethylhydrazide (M.P. 135–137° C., from aq. acetonitrile), in the amount of 356 g. is dissolved in 2.5 liters of dioxane and the solution, kept at 75–80° C., is treated with excess phosgene and heated at 75–80° C. for three hours more. The resulting solution is taken to dryness and the product, 2-(p-chlorophenyl)-4-methyl-$\Delta^2$-1,3,4-oxadiazolin-5-one (M.P. 151–152° C. from isopropanol), is mixed in the amount of 40 g. with chlorosulfonic acid (200 ml.). The mixture is heated under reflux for three hours and is then cooled and diluted with ice water (one liter). The resulting solid, 2-chloro-5-(4-methyl - 5 - oxo - $\Delta^2$ - 1,3,4 - oxadiazolin - 2 - yl)benzenesulfonyl chloride, is isolated, washed with ice water, dried, and added portionwise with stirring to aqueous methylamine (40%, 100 ml.) kept below 0° C. The mixture is held for 16 hours at room temperature and the resulting product which precipitates, 2-chloro-5-(4-methyl-5-oxo-$\Delta^2$ - 1,3,4 - oxadiazolin - 2 - yl) - N - methylbenzenesulfonamide, is isolated by filtration; M.P. 231–233° C. after washing with water and recrystallizing from 95% ethanol.

*Example 4*

A mixture of 7.0 g. of 2-chloro-5-(4-methyl-5-oxo-$\Delta^2$-1,3,4 - oxadiazolin - 2 - yl) - N - methylbenzenesulfonamide and 14 g. of benzylamine is heated at 90–95° C. for one hour. The resulting solution is cooled and neutralized with dilute acetic acid. The product, 4-benzyl-1-[4-chloro - 3 - (methylsulfamoyl) - benzoyl] - 2 - methylsemicarbazide, is collected by filtration and recrystallized from isopropanol; M.P. 223–225° C.

The same procedure using allylamine instead of benzylamine (in the same amount) and heating at reflux provides 4-allyl-1-[4-chloro-3-(methylsulfamoyl)benzoyl]-2-methylsemicarbazide; M.P. 195–196° C. (from isopropanol).

We claim:

1. A member of the group consisting of 1-(4-chloro-3-sulfamoylbenzoyl)-2-methylsemicarbazides of formula:

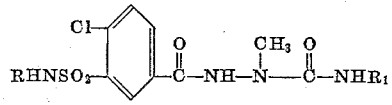

and sodium salts and potassium salts thereof; where R is a member of the group consisting of hydrogen and methyl, and $R_1$ is a member of the group consisting of hydrogen, benzyl, allyl, and alkyl of 1 to 4 carbon atoms.

2. 1 - (4 - chloro - 3 - sulfamoylbenzoyl) - 2 - methylsemicarbazide.

3. 4 - butyl - 1 - (4 - chloro - 3 - sulfamoylbenzoyl)-2-methylsemicarbazide.

4. 4 - allyl - 1 - (4 - chloro - 3 - sulfamoylbenzoyl)-2-methylsemicarbazide.

5. 1 - [4 - chloro - 3 - (methylsulfamoyl)benzoyl] - 2,4-dimethylsemicarbazide.

6. 4 - benzyl - 1 - [4 - chloro - 3 - (methylsulfamoyl)-benzoyl]-2-methylsemicarbazide.

7. 4 - allyl - 1 - [4 - chloro - 3 - (methylsulfamoyl)-benzoyl]-2-methylsemicarbazide.

References Cited by the Examiner

Stempel et al., Journal of Organic Chemistry, vol. 20 (1955), pages 412 to 418.

ALEX MAZEL, *Primary Examiner.*

JAMES H. TURNIPSEED, *Assistant Examiner.*